Aug. 11, 1931.  J. A. DIENNER  1,818,386
SHOCK ABSORBER
Filed Dec. 27, 1927   3 Sheets-Sheet 3
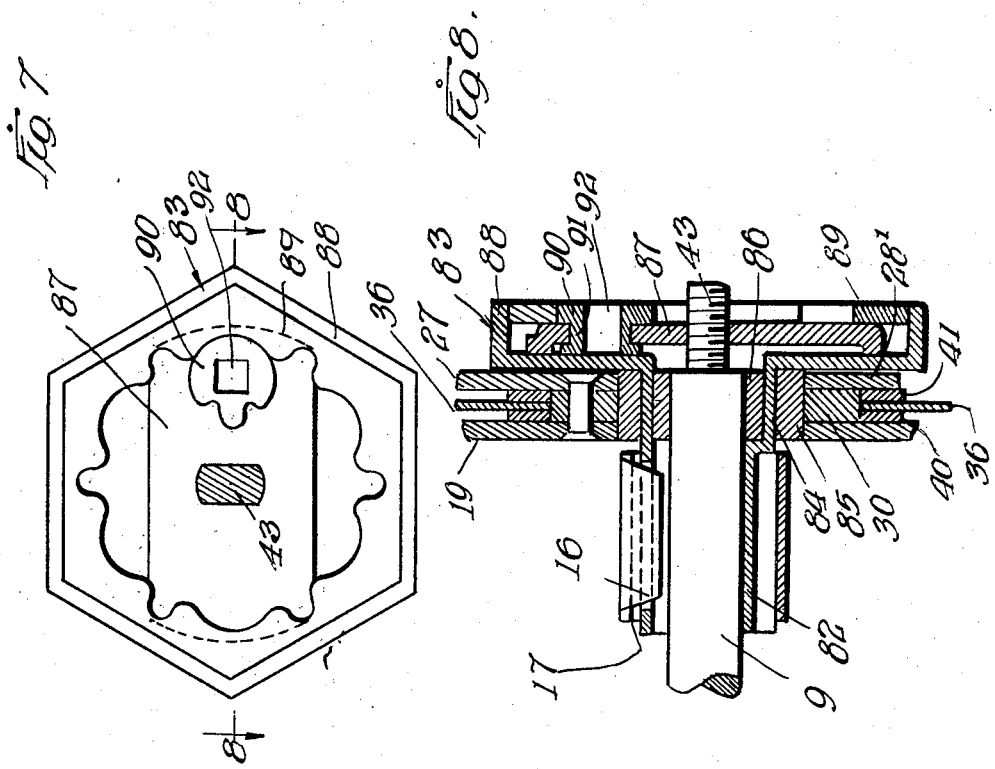
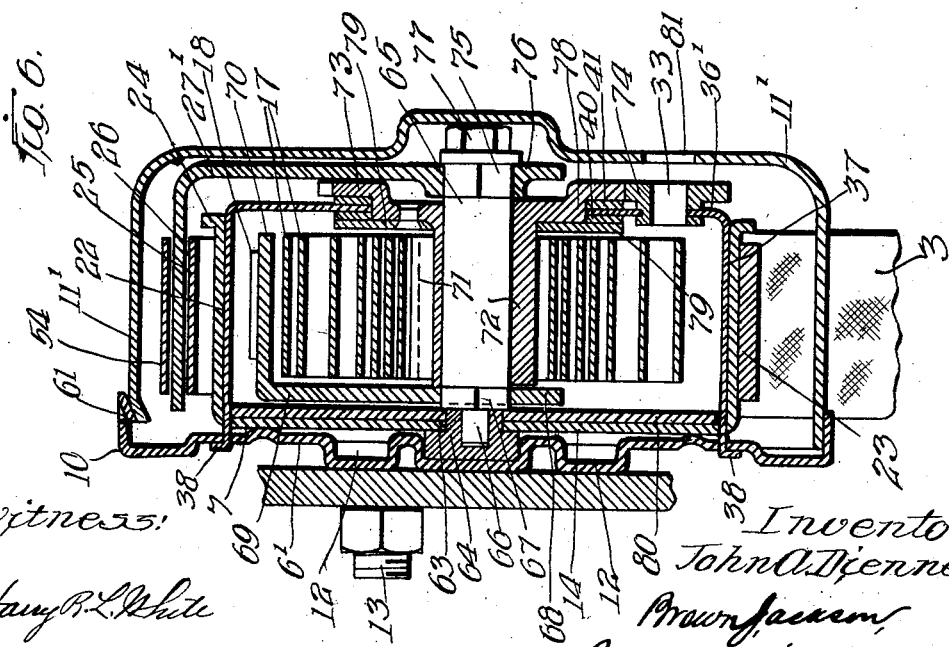

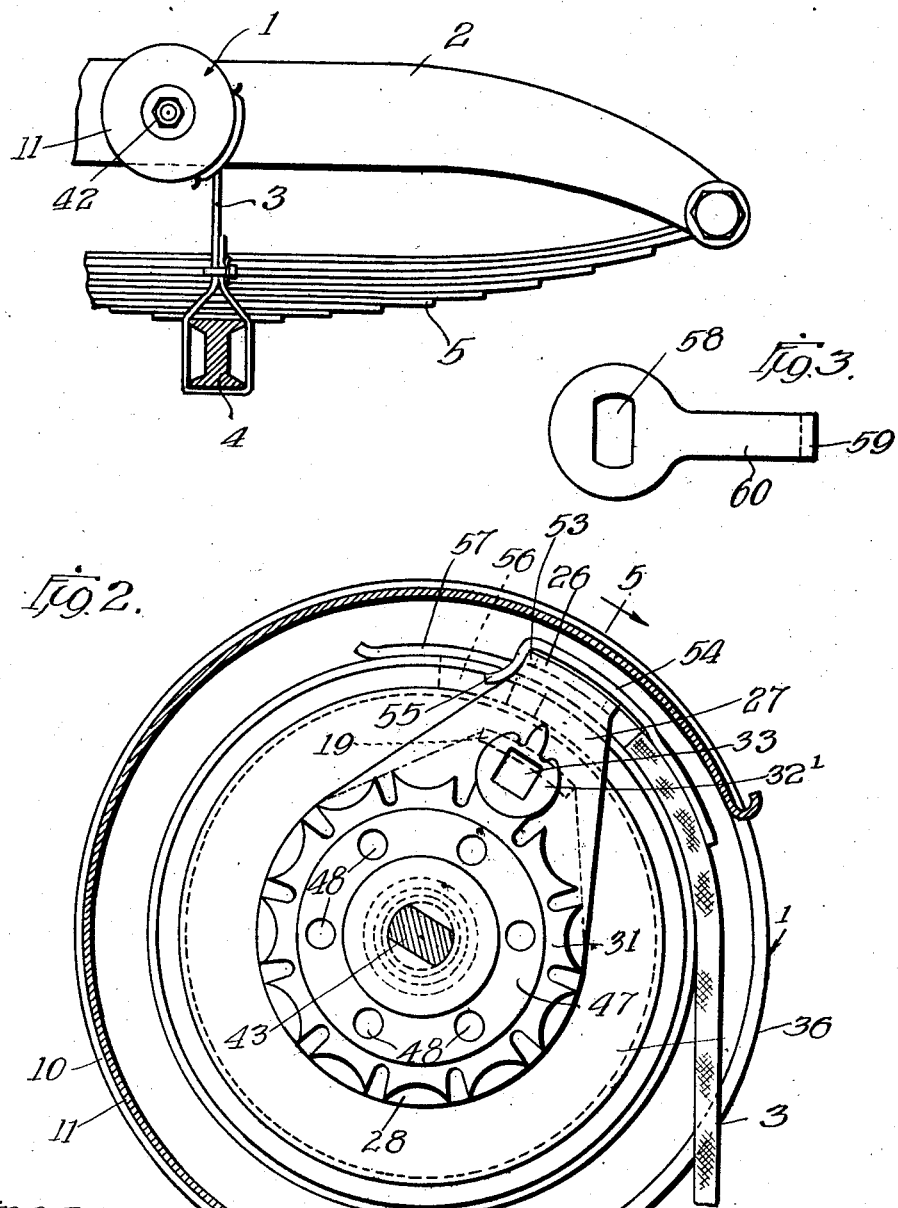

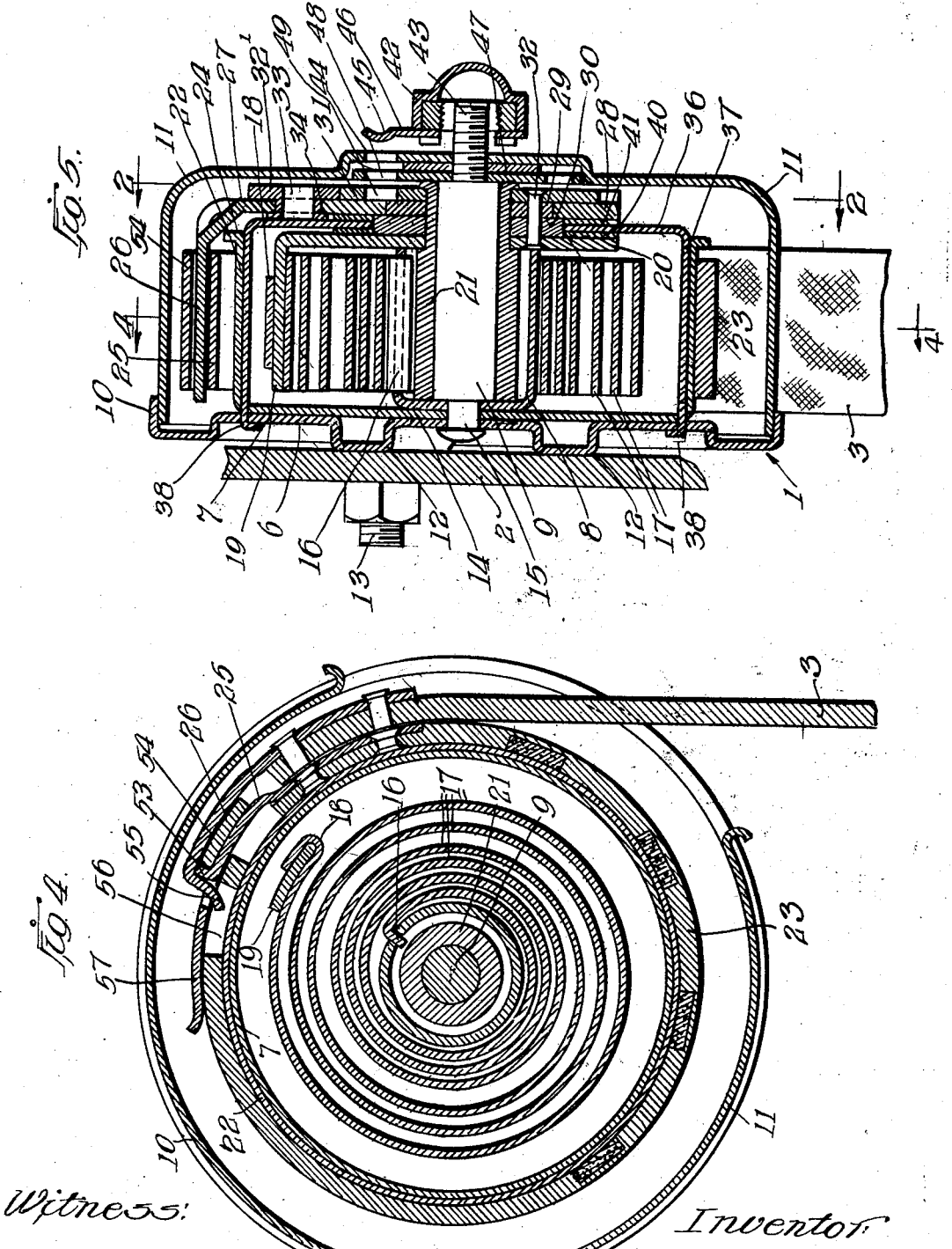

Patented Aug. 11, 1931

1,818,386

UNITED STATES PATENT OFFICE

JOHN A. DIENNER, OF EVANSTON, ILLINOIS, ASSIGNOR TO STROMBERG RESEARCH CORPORATION, OF CHICAGO, ILLINOIS, A CORPORATION OF ILLINOIS

SHOCK ABSORBER

Application filed December 27, 1927. Serial No. 242,734.

My invention relates to spring rebound controllers for vehicles, and the like, generally and incorrectly termed shock absorbers.

While the invention is shown as applied to a controller of the proportional resistance type, that is, the type first disclosed in Veitch Patent No. 907,427, it is not intended to be limited thereto.

In the development of a spring rebound controller of the proportional resistance type it has been found desirable to enclose the retrieving spring in a housing sealed during the life of the device, the housing retaining a lubricant and excluding water and dirt. When the device is applied to the vehicle it is desirable to have an adjustment of the tension of the retrieving spring to adapt it to the particular needs of the vehicle. Where the device is adjusted and sealed up when it leaves the factory, the individual adjustment of the spring tension to the vehicle is not readily made because in the devices with which I am familiar some form of key member normally holds the spring against expansion, and the workman must hold the spring tension with a wrench, or the like, while the key is being removed and again applied. This is inconvenient and unsatisfactory, for if the spring should escape from the wrench it is a difficult and tedious job to wind it up again.

The adjustment of the spring required for a given vehicle may be either increase or decrease of the tension of the retrieving spring.

According to the present invention I provide a Geneva gear and pinion to adjust the tension of the retrieving spring. By this means the spring may be tightened up or loosened without losing control of the same at any time. No loosening of any key or ratchet is necessary and yet adjustment can be made at a relatively great mechanical advantage because of the ratio of diameter of the Geneva pinion and its cooperating gear. Preferably because of operating characteristics the spring is of the spiral clock spring type and it has its outer end connected to the friction shoe or pull strap, and its inner end connected to the drum or frame. The Geneva gear and pinion may be disposed serially in either of these connections, that is, between the outer end of the spring and the friction shoe or between the inner end of the spring and the frame.

Other and incidental improvements will be apparent from the following detailed specification and claims.

Now in order to acquaint those skilled in the art with the manner of constructing and operating a device embodying my invention, I shall describe in connection with the accompanying drawings a specific embodiment of the same.

In the drawings:

Figure 1 is a side elevational view of the rebound controller applied to the frame and axle of a vehicle having the usual vehicle spring;

Fig. 2 is an elevational view of the mechanism inside the outer cover taken on the line 2—2 of Fig. 5;

Fig. 3 is a plan view of a locking key;

Fig. 4 is a vertical section taken on the line 4—4 of Fig. 5;

Fig. 5 is a longitudinal vertical section taken on the line 5—5 of Fig. 2;

Fig. 6 is a similar vertical longitudinal section of a modified form;

Fig. 7 is a fragmentary face view; and

Fig. 8 is a fragmentary sectional view of another modification.

As shown in Fig. 1, the controller 1 is mounted on the frame 2 of the vehicle, the strap 3 of the controller being connected to the axle 4, and said axle and frame being connected by the usual vehicle spring 5. Obviously, the controller 1 may be mounted on the axle and a strap connected to the frame, if desired, but it is preferable to put the controller on the frame. The controller 1 has a frame comprising the back plate 6, the drum and end plate designated by reference numeral 7 as a whole, the spring anchor 8, and the stud 9.

The plate 6 is provided with an upturned flange 10 to which there is secured, or within which there is received the outer cover member 11 to protect the controller as much as possible from the entry of dirt. The plate 6 is provided with bosses 12, 12 which rest against the frame 2 to support the same. The plate 6 also contains sockets for receiving the heads of bolts 13, one of which is shown in Fig. 5. The drum member 7 has a head or plate portion 14 which is spot welded to the plate 6 and is also secured thereto by means of the riveted end 15 of the stud 9. This stud has its sides slabbed off to provide shoulders and to provide for keying the stud to the frame, this slabbed off end fitting in an oblong hole in the head 14 of the drum member 7 and also in the back plate 6.

The spring anchor 8 is in the form of a cup, the bottom of which is also clamped under the shoulder formed on the inner end of the stud 9, the anchor 8 being slotted at 16 to receive the inner anchor end of the spring, as is clearly shown in Fig. 4. The spring 17 has a hook which slides into the slot 16 so as to hold the spring in place.

The outer end of the spring 17 is provided with a hook 18 which engages the end of an arm 19. The arm 19 has a hub portion 20 which is rigidly connected to a bearing sleeve 21 which bears upon the stud or pin 9. The drum member has a cylindrical bearing portion 22 on which there is supported a friction band or shoe 23. This friction band or shoe 23 is guided edgewise between a flange 24 and the back plate 6. The band or shoe 23 is connected by means of a connecting or anchoring clip 25 to the outer end 26 of an arm 27. Both arms 19 and 27 are L-shaped. The arm 27 is provided with a hub member 28 of substantially the same size as the hub member 20 of the inner arm, but instead of bearing directly on the bearing sleeve 21 the hub 28 of the arm 27 bears on a cylindrical shoulder 29, which is preferably the periphery of a brass plate. The brass plate and a spacing plate 30 are clamped between the hub 20 and the Geneva gear 31, as by means of rivets 32.

The spacing plate 30 extends peripherally beyond the brass plate 29 so that the hub 28 of the outer arm 27 is held between said spacing plate 30 and the Geneva gear 31.

The outer arm member 27 carries the Geneva pinion 32', which is provided with a polygonal socket 33 for the insertion of a T wrench. Obviously, instead of having a square opening, as shown, the opening could be hexagonal if desired. The Geneva pinion 32' is provided with a collar which extends through an opening in the arm 27 and is beaded over, as indicated at 34 in Fig. 5.

The drum member 7 is closed at the end opposite the plate 14 by a plate 36, which has a cylindrical portion 37 integral therewith extending into and closely fitting within the inner periphery of the cylindrical portion 22 of the drum member 7.

The plate 36, which closes the drum, is held in place by the fit within the cylindrical portion 22 and, in addition, is provided with prongs or ears 38 which are extended through the plate 14 of the drum member 7 and through the back plate 6 and then riveted over, as indicated in Fig. 5.

Since the two arms and the sleeve 21 rotate together in the normal operation of the device, a tight bearing is to be maintained between said cover plate 36 through which the connection may extend between the inner arm and the outer arm. This tight joint is secured by having the spacing plate 30 fit closely within the opening formed in the cover plate 36, and in having fiber washers 40 and 41 disposed between the margins of the plate 36 and the hubs 20 and 28. In this way a tight joint is made between the cover plate and the rocking or rotating system, including the two arms 19 and 27.

The outer end of the stud 9 is slabbed off as by a milling cutter, and the cylindrical surfaces are threaded to receive the cap nut 42. The cover member 11 has an oblong opening fitting over the threaded portion 43, and the cover member is adapted to be clamped in place by said cap nut 42. The cover 11 is provided with an opening 44 which is adapted to be closed by an extension 45 on the lock washer 46. A circular plate 47 has an oblong opening fitting over the threaded portion 43 of the stud 9 and anchored against turning thereupon. This plate 47 has a series of holes 48 therethrough adapted to register with the hole 44 in the cover member 11 and to register with holes 49 formed in the Geneva gear 31. A pin may be inserted in these parts through the holes 44, 48 and 49 to hold the spring under tension when the device is shipped from the manufacturer.

The anchor clip 25, which is secured to the friction band or shoe 23, has a lug or ear 53 lying on the front side of the arm 26, and the pull strap 3 has a hook member 54 provided with a nose 55 which extends through the opening out of which the lug or ear 53 has been struck from the clip 25.

This nose 55 extends down into an opening 56 formed in the free end of the shoe or band 23 to hold the free end loosely in place upon the drum. The clip 25 has an extending portion 57 circumferentially enclosing the free end of the band 23. The clip 25 is secured to the band by riveting. Likewise, the hook member 54 is connected to the strap 3 by suitable rivets.

It will be seen that the tension of the spring 17 is in a direction to keep the arm 26 always in contact with the ear 53 and it tends to keep the hook 54 in contact with the ear 53 so long as the spring 17 is under tension.

The operation of the device described is as follows:

As the main vehicle spring 5 is compressed by approach of the axle 4 to the frame 2, the take-up spring 17, which is under tension, wraps the pull strap 3 upon the periphery of the drum member 7 to a degree depending upon the deflection of the spring 5. The pull strap 3 is actually wrapped upon the outer surface of the band 23, but the band 23 is merely a friction shoe to save wear upon the pull strap. This friction band 23 may be of any suitable characteristic such, for instance, as brake lining material or a combination of rubber and canvas, or rubber and asbestos, with graphite or like insert, this feature forming no part of the present invention.

Upon recoil of the spring 5, the frame 2 with the body thereupon is thrown upwardly, but a resistance is interposed to such throw in amount corresponding to the spring deflection. This is apparent from the fact that the greater the deflection the greater is the amount of circumferential engagement between the pull strap 3 and the drum upon which it is wound.

When the device is shipped from the factory a metal pin (not shown) is inserted through the holes 44, 48 and 49 to lock the spring under normal tension, and upon mounting the device on the frame and securing the strap 3 to the axle the pin may be removed and the hole in the cover plate 11 covered by the extension 45 on the lock washer 46.

If it should be desired to change the spring tension to adapt the particular device to the particular needs of the vehicle, the cover member 11 is first removed by loosening the cap nut 42, whereupon a suitable wrench is inserted in the opening 33 of the pinion 32 and the pinion is turned either to the left or to the right, as may be desired, to increase or decrease the tension of the spring 17. It will be seen that in this form of the invention the Geneva gear and pinion is connected in series between the inner arm and the outer arm, and that it sustains the entire spring tension at all times. Since this tension always works in the same direction, there is no tendency for the parts to become loose and rattle. Due to the relatively great ratio of diameters, the adjustment of the spring is made with exceptional ease and facility and control of the spring tension is never lost, because the only way that the Geneva gear 31 can move angularly is to have the pinion 32' rotate. The connection is irreversible, that is to say, pressure by the gear 31 on the pinion 32' will not produce rotation, but will always maintain a locked connection.

If desired, the stud 9 and the lever 27 may be locked by means of a key, such as shown in Fig. 3, where the oblong opening 58 fits over the plate portion 43 of the stud 9, and the lateral extension 59 of the key member 60 is inserted in the opening 33 in the pinion 32 so that rotation is prevented during shipment.

If desired, the device may be shipped without being placed under spring tension, since it is so easy by means of the Geneva gear and pinion mechanism to wind up the spring to the desired extent.

Obviously, instead of an external gear pinion, an internal gear and pinion might be employed, as will be described later in connection with Figs. 7 and 8.

In the form shown in Fig. 6 the cover member 11' is held to the back plate 6' by catches 61 stamped out of the metal of the corresponding flanges.

In this form the back plate 6' is spot welded to the cooperating plate 14, which is the head of the drum member 7. A pocket 62 is formed between the back plate 6' and the head 14 of the drum member 7, and in this pocket is mounted a stationary bearing 63 preferably made of bronze, or the like, said bearing having a head seated in a corresponding polygonal depression in the back plate 13 and having a tubular neck 64 extending through an opening in the drum head 14.

A rotatable shaft 65 has a reduced cylindrical portion 66 which fits within the corresponding recess in said bearing member 63. Adjacent the reduced cylindrical bearing portion 66 is a squared portion 67 which is embraced by the hub 68 of the inner L-shaped arm 69. Said arm 69 has an extension 70 to which a hooked part 18 of the spring 17 is connected. The inner end of the spring 17 is connected by its hooked end in a slot 71 in the bearing sleeve 72. This bearing sleeve has an enlarged head portion 73 which forms a Geneva gear cooperating with the Geneva pinion 74 mounted in the cover plate 36'. This cover plate 36' has the cylindrical portion 37 with a press fit inside the cylindrical portion 22 of the drum member 7 and secured to the back plate 6' by means of the riveted lugs 38, as previously described.

The bearing sleeve 72 with its connected flange may be made of sheet metal with a suitable bearing or liner, if so desired, or it may be made of bronze, or other suitable anti-friction bearing metal. Its peripheral edge, that is, the edge of the flange 73 is cut or otherwise formed to produce the Geneva gear as shown at 31 in Fig. 2. The Geneva pinion 74 is provided with a rectangular recess 33 in which a wrench may be inserted, as previously described. In this case the inner end of said recess 33 is closed so as to maintain the tightness of the housing formed by the drum member 7 on the cover member 36'.

The outer end of the shaft 65 is squared, as indicated at 75, to receive the hub 76 of the outer arm 27'. The hub of the arm is held on the shaft by means of a cap screw 77 which threads into the end of the shaft and is prevented from becoming loose by means of a suitable spring washer, or the like. It will be observed that the arm 27' clears both the Geneva gear 73 and the pinion 74. The flange of the sleeve 72 has a shoulder at 78 which rests peripherally against the edges of the opening in the cover plate 36'. A pair of fiber washers 40 and 41 lie upon the opposite margins of the opening in the cover plate 36' and are held in assembled relation by means of an inner plate 79 which is preferably riveted or spot welded to the adjacent portion of the flange 73. In this case the bearing sleeve 72 constitutes both a bearing for the shaft 65 and a spring anchor for the inner end of the spring 17. The two arms 27' and 69 lie in the same plane so as to subject the bearings for the shaft 65 to as little wear as possible. Preferably fiber plates are laid between the edges of the spring and the adjacent parts to prevent catching of the spring coils upon any slight projection of these parts. I have not shown the fiber plates for the purpose of avoiding confusion in the drawings. I have shown, however, the fiber plate 80 as lying between the outside of the inner arm 69 and the bottom or head wall 14 of the drum member 7.

When it is desired to change the spring tension, it is necessary only to insert a wrench through the opening 81 in the cover member 11', whereupon the Geneva pinion 74 may be turned in either direction and may tighten or release the spring tension, as may be desired.

The pull strap 3, friction band 23, and the hook 54 with the anchor 25 are preferably the same as shown in connection with Figs. 2, 4 and 5.

Referring now to the modification shown in Figs. 7 and 8, I have shown the sheet metal sleeve 82 with the hexagonal head member 83 integral therewith, which is disclosed in the co-pending application of Milton E. Chandler, Serial No. 184,298, filed April 16, 1927, which rests upon the stud 9 and provides a slot 16 for the inner hooked end of the spring 17. The cylindrical portion 84 adjacent the hexagonal head 83 forms a bearing for the lever system comprising the inner L-shaped lever 19 and the outer L-shaped lever 27, which are connected together through an intervening spacing block 30 and sealed to the cover plate 36 through the fiber washers 40 and 41. An anti-friction bushing 85 is mounted within the hubs of the arms 19 and 27 and bears upon said cylindrical bearing portion 84. A bushing 86 is inserted between the tubular bearing portion 84 and the stud 9 to secure a firm support upon said stud.

The sleeve 82 is rotatable on said stud 9 to adjust the tension of the spring 17. I secure this adjustment by means of a plate 87 which has an oblong hole fitting over the flattened end 43 of the stud member 9 so as to be keyed thereto and having its outer ends adapted to fit within the upturned flange 88 which forms the hexagonal head 83. A plate 89 having its outer edge fitting within the inner periphery of the flange 88 forms an internal Geneva gear co-operating with the Geneva pinion 90, which is mounted in the key or plate 87. The pinion has an extending tubular collar 91 which is beaded over the inner edge of the opening in the plate 87 so as to mount said pinion permanently in said plate. A rectangular opening 92 is formed through the pinion so that the same may be engaged by a suitable rod or wrench for turning the same.

In the present modification, that is, the modification of Figs. 7 and 8, the adjustment is made on the inner end of the spring, that is, at the spring anchor at the inner end of the spring by a sleeve member which, in this case, provides upon its exterior surface a bearing for the lever system, whereas in the form shown in Fig. 6 the sleeve forms on its inner surface a bearing for the lever system.

A series of openings may be provided in register with the Geneva pinion 90 and extending into the movable arm system to pin these parts together for shipment.

It will be seen in each form that the Geneva gear and pinion are connected serially in line with the retrieving spring, either at the outer end or at the inner end, so that they sustain at all times the spring tension. It is desirable to mount the Geneva gear and pinion at the inner end in order to decrease the weight of the moving piston.

I do not intend to be limited to the details shown or described.

I claim:—

1. In a rebound controller, the combination of a relatively stationary drum, a relatively movable shoe, a coil retrieving spring connected to said shoe, a spring anchor for holding one end of the spring, and means in the spring connection for adjusting the tension of the spring comprising a Geneva gear and a Geneva pinion.

2. In a rebound controller, the combination of a frame having a stationary drum, a friction member playing on said drum, a retrieving spring for said friction member, a connection between the outer end of the spring and the friction member, a connection between the inner end of the spring and the frame, and a Geneva gear and pinion included serially in one of said connections.

3. In a rebound controller, the combination of a frame having a stationary drum, a friction member playing on said drum, a retrieving spring disposed within the drum, a connection between the outer end of the spring and said member to move the member about the periphery of said drum, said connection including a pair of overlapping L-shaped arms, a connection between the inner end of the spring and the frame, and a Geneva gear and pinion included serially in one of said connections.

4. In a rebound controller, the combination of a frame bearing a stationary drum, a friction shoe movable about the periphery thereof, said drum being closed to provide a tight spring housing, a retrieving spring in said housing, a connection between the outer end of the spring and said shoe, said connection comprising an arm within the housing, an arm outside the housing, and a connecting member between the arms, said housing having a bearing for said connecting member providing a tight joint, a connection between the inner end of the spring and the frame, and a Geneva gear and pinion included serially in one of said connections.

5. In a spring rebound controller, a cylindrical drum having closed ends and a closed periphery, a take-up spring in the drum, a Geneva gear and pinion for adjusting the tension of said spring, and a member having variable contact with the exterior periphery of said drum and connected to said spring.

6. In a spring rebound controller, a closed drum forming a spring housing, a rotatable member projecting through said housing, a spring anchor in said drum, a spring having its ends connected to said rotatable member and anchor, respectively, means for adjusting the tension of said spring comprising a Geneva gear and pinion, and a flexible member frictionally engaging the exterior periphery of said drum and having an end connected to said rotatable member so as to rotate the latter.

7. In a rebound controller, a frame having a drum member connected thereto, a stationary spring anchor connected to said frame inside the drum, a spiral spring having its inner end connected to the spring anchor, a pair of L-shaped arms, a cover member for the drum lying between said arms, a flexible member slidable over the periphery of the drum connected at one end to the outer arm, and a Geneva gear and pinion connected between the arms for adjusting the spring tension.

8. In a device of the class described, the combination of a frame member having a closed drum secured thereto, a rotatable sleeve projecting into the drum and forming a spring anchor, a Geneva pinion mounted on the frame, and a Geneva gear secured to the sleeve for adjusting the tension of the spring.

9. In combination, a stationary frame member comprising a drum, a spring mounted within the drum, a sleeve extending into the drum and having a Geneva gear connected thereto outside the drum, a Geneva pinion rotatably mounted on the frame and cooperating with the Geneva gear, a tension member having variable contact with the exterior periphery of the drum, and connected to the outer end of the spring.

10. In combination, a frame including a closed drum, a coil spring in the drum, a sleeve connected to the inner end of the spring within the drum, a Geneva gear connected to the sleeve, a Geneva pinion rigid with and rotatable on the frame and cooperating with said Geneva gear, a pull strap wrapped to a variable extent around the drum, an arm lying within the drum and connected to the outer end of the spring, an arm lying outside the drum and connected at its outer end to the pull strap, said arms being connected together and having a bearing surface in contact with the sleeve.

11. In a device of the class described, a frame member comprising a drum, a stationary bearing at the inner end of the drum, a cover for the drum, a sleeve member having a bearing in the cover for the drum and providing a spring anchor, a spring in the drum connected to said anchor, a shaft mounted in said bearing and in said sleeve, an arm connected to the inner end of the spring and to the shaft, a pull strap adapted to be wrapped to a variable extent around the drum, and an arm connecting the pull strap to the shaft.

12. In a device of the class described, a frame member comprising a drum, a stationary bearing at the inner end of the drum, a cover for the drum, a sleeve member having a bearing in the cover for the drum and providing a spring anchor, a spring in the drum connected to said anchor, a shaft mounted in said bearing and in said sleeve, an arm connected to the inner end of the spring and to the shaft, a pull strap adapted to be wrapped to a variable extent around the drum, an arm connecting the pull strap to the shaft, and means for adjusting the tension of the spring, said means comprising a Geneva gear and pinion.

13. In a device of the class described, a frame comprising a drum, a bearing within the drum, a spring anchor comprising a sleeve rotatably mounted in the cover for the drum, a cover for said drum, a spring in the drum connected to said spring anchor, a shaft mounted in the bearing and in said sleeve, a strap adapted to be wrapped to a variable extent around the drum, and arms connecting the shaft to the spring and to the pull strap, respectively.

14. In combination, a frame comprising a drum, a cover for the drum, a bearing within the inner end of the drum on the frame, a shaft mounted in the bearing, a sleeve rotatably mounted in the cover and providing a bearing for the shaft, a spring in the drum anchored at its inner end to the sleeve, a strap adapted to be wrapped to a variable extent about the periphery of the drum, means including said shaft for connecting the outer end of the spring to the strap, and means including a Geneva gear and pinion for changing the position of the sleeve to adjust the tension of the spring.

15. In a device of the class described, a stationary frame including a drum, a cover for the drum, a spring within the drum, an arm within the drum connected to the outer end of the spring, an arm outside the drum, a pull strap adapted to be wrapped to a variable extent about the periphery of the drum, and means connecting the outer and the inner arms, said means including a Geneva gear and pinion.

In witness whereof, I hereunto subscribe my name this 21st day of December, 1927.

JOHN A. DIENNER.